United States Patent
Adzic et al.

(10) Patent No.: US 8,048,548 B2
(45) Date of Patent: Nov. 1, 2011

(54) ELECTROCATALYST FOR ALCOHOL OXIDATION AT FUEL CELL ANODES

(75) Inventors: Radoslav Adzic, East Setauket, NY (US); Andrzej Kowal, Cracow (PL)

(73) Assignee: Brookhaven ScienceAssociates, LLC, Upton, NY (US)

( * ) Notice: Subject to any disclaimer, the term of this patent is extended or adjusted under 35 U.S.C. 154(b) by 1059 days.

(21) Appl. No.: 11/853,368

(22) Filed: Sep. 11, 2007

(65) Prior Publication Data

US 2009/0068505 A1 Mar. 12, 2009

(51) Int. Cl.
*H01M 4/92* (2006.01)

(52) U.S. Cl. .......... 429/13; 429/483; 429/524; 429/492; 429/479; 429/523; 502/101; 502/226; 502/245; 502/262; 427/115

(58) Field of Classification Search .................. 429/483, 429/524, 492, 479, 523; 502/101, 226, 245, 502/262; 427/115
See application file for complete search history.

(56) References Cited

U.S. PATENT DOCUMENTS

| | | | |
|---|---|---|---|
| 4,797,182 A | 1/1989 | Beer et al. | |
| 5,132,193 A | 7/1992 | Reddy et al. | |
| 5,133,842 A * | 7/1992 | Taylor et al. | 205/532 |
| 5,470,673 A | 11/1995 | Tseung et al. | |
| 5,702,836 A * | 12/1997 | Ma et al. | 429/506 |
| 5,804,325 A | 9/1998 | Yepez | |
| 6,248,460 B1 | 6/2001 | Surampudi et al. | |
| 6,551,960 B1 * | 4/2003 | Laine et al. | 502/327 |
| 6,660,680 B1 | 12/2003 | Hampden-Smith et al. | |
| 7,176,157 B2 * | 2/2007 | Ball et al. | 502/101 |
| 7,250,232 B2 * | 7/2007 | Boysen et al. | 429/535 |
| 7,432,221 B2 * | 10/2008 | Kim et al. | 502/185 |
| 7,691,780 B2 * | 4/2010 | Adzic et al. | 502/339 |
| 7,723,260 B2 * | 5/2010 | Mei et al. | 502/310 |
| 2003/0082436 A1 * | 5/2003 | Hong et al. | 429/44 |
| 2004/0248730 A1 | 12/2004 | Kim et al. | |
| 2005/0059839 A1 | 3/2005 | Liu et al. | |
| 2006/0099482 A1 | 5/2006 | Scott et al. | |
| 2007/0178365 A1 * | 8/2007 | Sugimasa et al. | 429/44 |
| 2008/0050641 A1 * | 2/2008 | Dressick et al. | 429/42 |
| 2008/0245186 A1 * | 10/2008 | Yang et al. | 75/362 |

FOREIGN PATENT DOCUMENTS

EP 1408569 A2 4/2004

OTHER PUBLICATIONS

Kowal et all. Nature Materials, 2009,v.8, 325-330.*
Wang et all., Chem. Mater,200,12,1622-1627.*

* cited by examiner

*Primary Examiner* — Patrick Ryan
*Assistant Examiner* — Alex Usyatinsky
(74) *Attorney, Agent, or Firm* — Dorene M. Price

(57) ABSTRACT

In some embodiments a ternary electrocatalyst is provided. The electrocatalyst can be used in an anode for oxidizing alcohol in a fuel cell. In some embodiments, the ternary electrocatalyst may include a noble metal particle having a surface decorated with clusters of $SnO_2$ and Rh. The noble metal particles may include platinum, palladium, ruthenium, iridium, gold, and combinations thereof. In some embodiments, the ternary electrocatalyst includes $SnO_2$ particles having a surface decorated with clusters of a noble metal and Rh. Some ternary electrocatalysts include noble metal particles with clusters of $SnO_2$ and Rh at their surfaces. In some embodiments the electrocatalyst particle cores are nanoparticles. Some embodiments of the invention provide a fuel cell including an anode incorporating the ternary electrocatalyst. In some aspects a method of using ternary electrocatalysts of Pt, Rh, and $SnO_2$ to oxidize an alcohol in a fuel cell is described.

17 Claims, 3 Drawing Sheets

ELECTROCATALYST FOR ALCOHOL OXIDATION AT FUEL CELL ANODES

This invention was made with Government support under contract number DE-AC02-98CH10886, awarded by the U.S. Department of Energy. The Government has certain rights in the invention.

BACKGROUND OF THE INVENTION

The present invention relates to electrocatalyst compositions. More specifically, the invention relates to electrocatalysts which can be used on the anode of a fuel cell to oxidize alcohol, in particular, ethanol.

A fuel cell is an electrochemical device with an anode and a cathode that converts chemical energy provided by a fuel and an oxidant into electricity. An electrolyte is required which is in contact with both electrodes and which may be alkaline, acidic, solid or liquid. The basic process is highly efficient and essentially pollution-free. Also, since single fuel cells can be assembled in stacks of varying sizes, systems can be designed to produce a wide range of output levels.

As an energy conversion device, the fuel cell is distinguished from a conventional battery by its fuel storage capacity. Unlike a battery which consumes internally stored fuel and needs to be either discarded or recharged after a certain time, fuel is fed to the fuel cell from an external source giving the fuel cell a practically unlimited storage capacity. Also, the fuel cell is distinguished from a battery in that its electrodes are catalytically active.

Current is generated by reaction on the fuel cell electrode surfaces, which are in contact with an electrolyte. The fuel is oxidized at the anode and gives up electrons to an external electrical load. The oxidant accepts electrons and is reduced at the cathode. Ionic current through an electrolyte completes the circuit.

In many fuel cell systems, a hydrogen fuel is produced by converting a hydrocarbon-based fuel such as methane, or an oxygenated hydrocarbon fuel such as methanol, to hydrogen in a process called reforming. This reformate fuel contains, in addition to hydrogen, high levels of carbon dioxide, usually around 25%. The reformate fuel also contains small amounts of impurities, such as carbon monoxide, typically at levels of around 1%.

Other fuel cells, called "direct" or "non-reformed" fuel cells oxidize fuel high in hydrogen content directly, without the hydrogen first being separated by a reforming process. It has been known since the 1950s that lower primary alcohols, particularly the C1-C5 alcohols, can be oxidized directly (i.e., without reformation to $H_2+CO$ or $H_2+CO_2$) at the anode of a fuel cell. Methanol and ethanol are particularly useful.

Because compactness is critical to the commercial viability of utilizing a fuel cell as an energy source in such items as electric automobiles, the ability to oxidize alcohol as a fuel directly without having to also utilize a reformer is important. Serious drawbacks have also been encountered in the storage of hydrogen for use in fuel cells. Thus, a "direct" fuel cell, such as an ethanol fuel cell, is advantageous in that it is compact and no energy is used up in reformation. Further, the fuel is easily stored in liquid form, is high in hydrogen content, is highly reactive in a fuel cell, and is economically viable.

In a typical ethanol fuel cell, ethanol is oxidized to produce electricity, heat, water, and carbon dioxide. The goal in ethanol fuel processing is complete ethanol oxidation for maximum energy generation as shown in the equation:

Anode: $CH_3CH_2OH+3H_2O \rightarrow 2CO_2+12H^++12e^-$

Cathode: $3O_2+12e^-+12H^+ \rightarrow H_2O$

Net: $CH_3CH_2OH+3O_2 \rightarrow 2CO_2+3H_2O$. (1)

In the absence of an electrocatalyst, a typical electrode reaction occurs, if at all, only at very high overpotentials. Thus, the oxidation and reduction reactions require catalysts in order to proceed at useful rates. Catalysts that promote electrochemical reactions, such as oxygen reduction and hydrogen oxidation in a fuel cell, are often referred to as electrocatalysts. Electrocatalysts are important because the energy efficiency of any cell is determined, in part, by the overpotentials necessary at the cell's anode and cathode.

Platinum (Pt), an expensive metal, is the best catalyst for many electrochemical reactions, including ethanol oxidation. A major obstacle in the development of ethanol fuel cells is the loss of electrochemical activity of even the best electrocatalyst due to "poisoning" by carbon monoxide (CO), and the accumulation of other intermediates such as acetate and acetaldehyde caused by the inability of Pt to break C—C bonds except at very high potentials. CO is an intermediate in the oxidation of ethanol to carbon dioxide ($CO_2$). The CO molecule is strongly adsorbed on the electroactive surface of the electrode, obstructing the oxidation of new fuel molecules. It is well known that CO, even at levels of 1-10 ppm, is a severe poison to platinum electrocatalysts and significantly reduces fuel cell performance.

Various attempts have been made to find a solution to the CO poisoning problem. For example, Reddy et al., U.S. Pat. No. 5,132,193 discloses the use of gold crystals for the oxidation of alcohol. Yepez, U.S. Pat. No. 5,804,325, discloses the use of deliberately occluded hydrogen in the anode to chemisorb the poisons. Various combinations of metals have also been employed as an electrocatalyst material in an attempt to avoid or minimize the CO poisoning problem. For example, Ma et al. U.S. Pat. No. 5,702,836 discloses an electrocatalyst obtained by combining platinum oxides and iron oxides to form Pt/Fe particles in a colloidal solution.

In spite of the foregoing, prior attempts to solve the problem of CO poisoning and breaking the C—C bond at the anode of ethanol fuel cells have been unsuccessful. Prior attempts to avoid the problem have proven to be too expensive, ineffective, or impractical to be commercially viable. Thus, there remains a need for electrocatalysts that can be used on the anode for alcohol oxidation in fuel cells and that are resistant to CO poisoning and can break the C—C bond at low potentials.

SUMMARY OF THE INVENTION

In some embodiments, an electrocatalyst can include tin dioxide ($SnO_2$) particles having a surface that includes a noble metal and rhodium (Rh). The electrocatalyst may optionally be on a support. The preferred support is high surface area carbon.

The $SnO_2$ particles are preferably nanoparticles having a diameter of from about 4 nm to about 100 nm. The $SnO_2$ loading is about 20 μg/cm² to about 400 μg/cm².

The noble metal may be selected from platinum, palladium, ruthenium, iridium, gold, or combinations thereof. Platinum is a preferred noble metal.

Pt and Rh are preferably present on the surface of the nanoparticles in clusters comprising from about 2 to about 100 atoms; the clusters may be homogeneous or heterogeneous. The platinum loading and the Rh loading are each about 1 μg/cm² to about 200 μg/cm².

In another embodiment, the electrocatalyst can include noble metal particles having a surface that includes $SnO_2$ and Rh. The noble metal particles may be supported on high surface area carbon or another convenient support material.

The noble metal particles may be selected from platinum, palladium, ruthenium, iridium, gold, or combinations thereof. Platinum is preferred. When platinum is used, the platinum loading may be about 1 $\mu g/cm^2$ to about 200 $\mu g/cm^2$. Preferably, the platinum loading is about 5 $\mu g/cm^2$ to about 50 $\mu g/cm^2$. In a preferred embodiment, the platinum particles are nanoparticles having a diameter of from about 0.5 nm to about 100 nm, and preferably 1 nm to about 5 nm.

$SnO_2$ and Rh are preferably present on the surface of the noble metal nanoparticles in clusters containing from about 2 to about 100 atoms. Clusters of the $SnO_2$ and Rh may be mixed, including molecules of both types, or may contain only a single species. The $SnO_2$ loading may be about 10 $\mu g/cm^2$ to about 400 $\mu g/cm^2$. The Rh loading may be about 1 $\mu g/cm^2$ to about 200 $\mu g/cm^2$.

In another aspect, the invention relates to an anode for use in the oxidation of alcohol in a fuel cell. The electrocatalyst compositions of the invention can be used in the anode.

The invention also relates to a method of oxidizing an alcohol by contacting the alcohol with an anode including the electrocatalyst compositions. In a preferred embodiment, the alcohol is ethanol.

By using the anode of the invention to oxidize alcohol in a fuel cell, carbon monoxide poisoning may be significantly reduced and the C—C bond splitting may be achieved at low potentials to facilitate a complete oxidation of ethanol to $CO_2$, thereby increasing the ability of the anode to oxidize alcohol fuel. Other advantages include lower costs due to lower weight of noble metals, higher stability with respect to agglomeration, and increased activity at lower overpotentials.

DETAILED DESCRIPTION OF THE INVENTION

Figure 1:
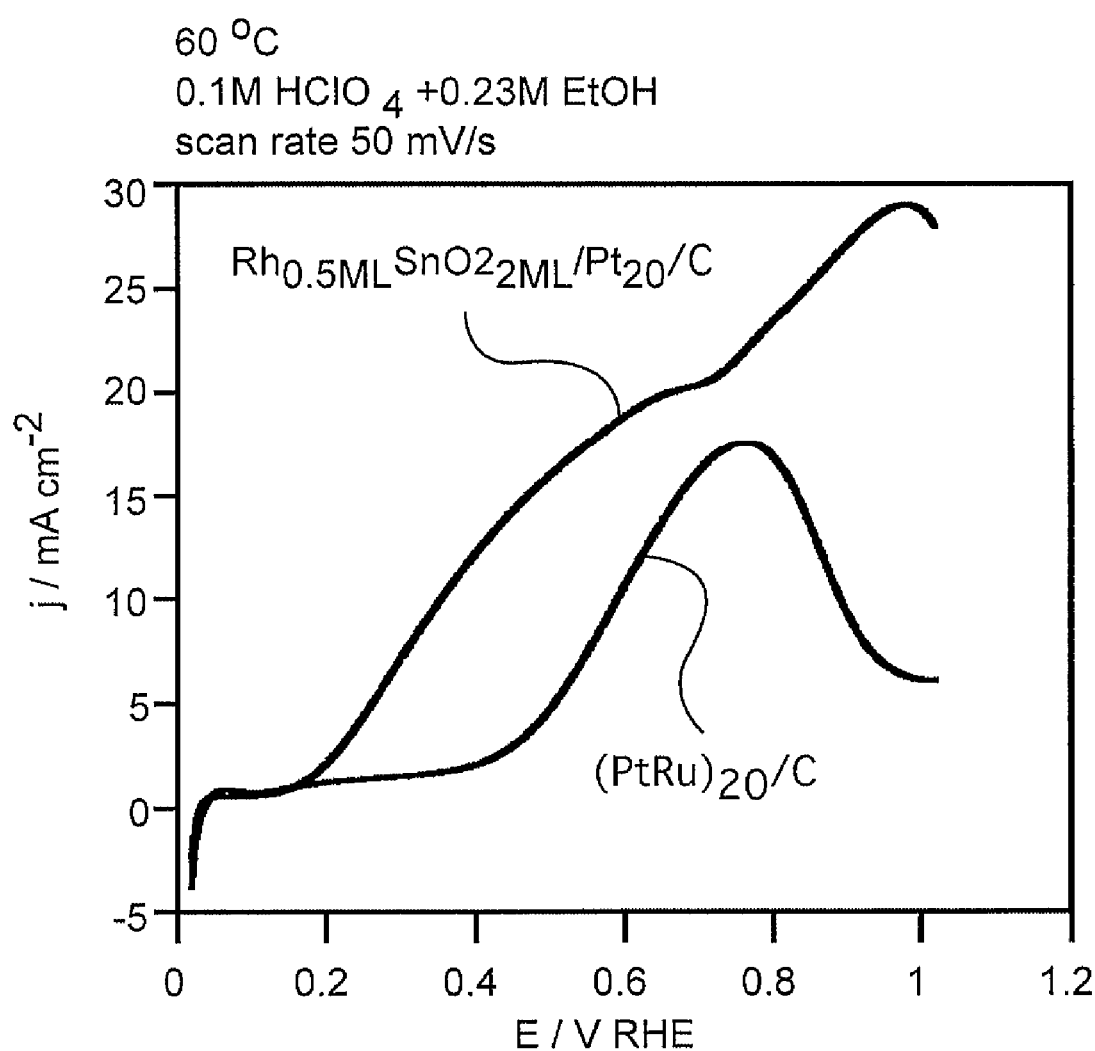
FIG. 1 demonstrates the relationship between current and applied potential obtained for two electrocatalyst materials.

In one aspect of the invention, electrocatalysts are provided. In some embodiments of the invention, the electrocatalysts include tin dioxide ($SnO_2$) particles having a surface that includes a noble metal and rhodium (Rh). In some embodiments, the electrocatalysts include particles having noble metal cores and surfaces decorated with clusters of Rh and $SnO_2$.

The electrocatalysts may contain a support on which the particles are located. In a preferred embodiment, the particles are supported on high surface area carbon. Preferably, the carbon has a surface area of about 20 to about 120 $m^2/g$. High surface area carbon is commercially available; for example, it is sold by Vulcan™ under the trade name "XC-72 black carbon powder."

The $SnO_2$ particles of the invention are preferably nanoparticles. The $SnO_2$ nanoparticles have a minimum dimension of from about 4 nm, preferably 10 nm, and most preferably 20 nm; for spheroid particles this dimension may be referred to as the diameter. The maximum diameter of the $SnO_2$ nanoparticles may be about 100 nm, more preferably about 90 nm, and most preferably about 80 nm. The $SnO_2$ loading is about 20 $\mu g/cm^2$ to about 400 $\mu g/cm^2$.

The surface of the $SnO_2$ particles is decorated with a noble metal and Rh. The noble metal and Rh are preferably present on the surface of the nanoparticles in clusters. Each cluster may contain about 2 to about 100 atoms; and may be of mixed species or of a single species.

The noble metal is selected from platinum, palladium, ruthenium, iridium, gold, or combinations thereof. Preferably, the noble metal is platinum.

The platinum loading is preferably about 1 $\mu g/cm^2$ to about 200 $\mu g/cm^2$ The Rh loading is also preferably about 1 $\mu g/cm^2$ to about 200 $\mu g/cm^2$.

In another embodiment, the electrocatalyst includes particles having a core of noble metal a surface of $SnO_2$ and Rh.

The noble metal particles are selected from platinum, palladium, ruthenium, iridium, rhodium, gold, or combinations thereof. Preferably, the noble metal particle is platinum. Generally, the platinum loading is about 5 $\mu g/cm^2$ to about 50 $\mu g/cm^2$.

The noble metal particles of the invention are preferably nanoparticles with a minimum diameter of from about 0.5 nm and more preferably about 1 nm. The noble metal nanoparticles have a maximum diameter of about 100 $\mu m$, more preferably about 50 nm, more preferably about 20 nm, and most preferably about 5 nm. In a preferred embodiment, the nanoparticles have a diameter of from about 1 nm to about 5 nm.

$SnO_2$ and Rh may be deposited onto the noble metal particles. $SnO_2$ and Rh are preferably deposited in clusters. A cluster may contain from about 2 to about 100 molecules or atoms, respectively. Clusters may be heterogeneous, comprising both $SnO_2$ and Rh, or homogeneous, comprising either $SnO_2$ or Rh. Generally, the tin dioxide loading is about 10 $\mu g/cm^2$ to about 400 $\mu g/cm^2$ and the rhodium loading is about 1 $\mu g/cm^2$ to about 200 $\mu g/cm^2$.

The electrocatalyst compositions of the present invention can be prepared by any known method, such as chemical or electrochemical deposition of the noble metal and Rh on the $SnO_2$ particles or deposition of $SnO_2$ and Rh on the noble metal particles. However, it is preferred that the electrocatalysts are formed so as to maximize the surface area of the particles. This will increase the contact between the alcohol and the metal and maximize the ability of the metal to catalyze the oxidation of the alcohol. Preferred methods include deposition with low current density, or chemical deposition with a mild reducing agent such as citric acid or dilute $NaBH_4$ solution. These methods generally yield smaller particle sizes of the deposit.

For example, the electrocatalyst including $SnO_2$ particles having a surface of Pt and Rh can be made by synthesizing $SnO_2$ by mixing the $SnCl_4$ solution with NaOH or $NH_4OH$ solutions. The oxide precipitated is washed and heated in air or $O_2$ for 0.5 to 2 hours to complete the oxidation of Sn. In a following step, Pt can be deposited on $SnO_2$ or a combination of Rh and Pt can be deposited on $SnO_2$.

Pt or a combination of Pt and Rh can be deposited onto $SnO_2$ particles by displacing Pb using a $Pb^{2+}/Pb^0$ method. A Pb adlayer is placed on $SnO_2$ by adsorbing $Pb^{2+}$ cations, followed by electrochemical reduction of $Pb^{2+}$ to $Pb^0$. Pt is deposited by displacing Pb upon immersion in $Pt^{2+}$ solution. Then, Rh can be deposited on Pt by displacing a Cu monolayer adsorbed on Pt. Likewise, Pt and Rh are deposited on $SnO_2$ particles using the $Pb^{2+}/Pb^0$ method described above by displacing Pb upon immersion in $Pt^{2+}$ and Rh solution.

The electrocatalyst that includes Pt particles having a surface of $SnO_2$ and Rh can be synthesized, for example, by oxidizing $SnCl_4$ that impregnates Pt/C particles to $SnO_2$ at elevated temperatures. Rh can be deposited onto either the Pt particles or $SnO_2$. For example, Rh can be deposited by displacing a Cu monolayer adsorbed onto Pt. Alternatively, Rh can be deposited onto $SnO_2$ using the $Pb^{2+}/Pb^0$ method described above.

The processes described above can be repeated to attain the desired level of coating required for the electrocatalyst.

In another aspect of the invention, an electrode is provided that includes an electrocatalyst described above. The structure of a typical electrode in an alcohol fuel cell includes 1) a fluid permeable side or face with hydrophobic characteristics and 2) a catalytic side or face provided with a particulate electrocatalyst. The catalytic face is in direct contact with a liquid or solid electrolyte.

In order to form an electrode, the electrocatalyst material of the invention is carried on a conductive support. Suitable conductive supports are, for example, commercially available conductive carbons. The conductive support can be used as commercially prepared, or can be treated to increase its graphitic character. The preferred range of catalyst to support ratio is generally about 1-to-15. Other materials with good electrical conductivity and high resistance toward acids may be used as a conductive support or added to a conductive support.

The hydrophobic characteristics of the electrode can be provided by any known suitable substance such as a fluorinated polymer, e.g., polytetrafluoroethylene (PTFE) or polytrifluorochloroethylene or a copolymer of tetrafluoroethylene and a second fluorinated monomer. A preferred range of the hydrophobic substance, which also serves as a binder for the noble metal and support, is generally about 20 wt % to about 40 wt % of the amount of conductive support.

The electrocatalyst material may be incorporated into a membrane-electrode assembly (MEA) by well-documented procedures. Preferred methods include spraying or painting of a liquid suspension of catalyst (catalyst ink) onto the support material, mixing a powdered catalyst and support, or any other method resulting in a relatively uniform layer of the catalyst and its support in the MEA.

For example, to form the electrode and, more specifically, the anode that includes an electrocatalyst as described above, the powdered electrocatalysts were mixed with an appropriate amount of carbon (Vulcan™) previously mixed with a fluorinated polymer, such as polytetrafluoroethylene In general, the thickness of the electrocatalyst on the conductive support is between about 0.02 mm and about 1 mm, preferably about 0.05 mm.

Electrodes typically are formed into various shapes such as a tube, rod, or a sheet. It is preferred that the electrodes of the invention be formed into thin sheets to maximize the surface area-to-volume ratio. The sheets may be wrapped or folded to provide additional useful electrode configurations.

In another aspect of the invention, the anodes containing the electrocatalysts described above can be incorporated into a standard alcohol fuel cell. The fuel cell of the invention can be a direct fuel cell, meaning that there is no need to use a catalytic reformer to generate pure hydrogen from the alcohol to feed the fuel cell.

Preferred alcohols are aliphatic alcohols, which may be straight-chain, branched-chain or cyclic, saturated or unsaturated. Preferred aliphatic alcohols are those having up to and including five (5) carbon atoms, for example, methanol, ethanol, propan-1-ol, propan-2-ol, and butyl and amyl alcohols. Ethanol is most preferred. The alcohol concentration in the fuel cell will typically be in the range of 0.5 mol/l to 5.0 mol/l.

It is also known to oxidize an alcohol at the anode when the alcohol is vaporized to a gaseous fluid and then fed to the fluid-permeable side of a gas-diffusion electrode. This vaporization can be carried out by heating the alcohol fuel directly or by passing an inert carrier gas (e.g., $N_2$) through it.

Electrochemical oxidation of alcohols, especially in fuel cells, is normally carried out in acidic aqueous media. The acid concentration in such media is typically in the range of 0.5-2.0 mol/l. The acid is preferably a strong acid such as sulfuric acid, phosphoric acid, and perchloric acid. Hydrochloric acid is less preferred. Although the acidic medium may also contain a supporting electrolyte, such as a salt with or without a common anion with the acid, it is preferred that such supporting electrolyte not be present.

Solid polymer electrolytes can also be used in the alcohol fuel cell of the invention, and are sometimes preferred because of their excellent "cold start" capabilities and other advantages relating to ease of manufacture and avoidance of evaporation problems. Reliable acidic solid polymer electrolytes are commercially available, e.g., the sulfonated fluorinated olefin materials sold under the trademark NAFION by E.I. dupont deNemours and Co. of Wilmington, Del. Such membrane-like materials have a fluorinated olefin homopolymer or copolymer "backbone" and pendent partially or fully fluorinated hydrocarbon and/or ether chains or groups terminated with acidic groups, preferably —$SO_3H$, but phosphonic acid or boric acid type groups are also known.

The air or oxygen cathode of a fuel cell used in this invention can, if desired, be conventional in every respect. The electrocatalyst at the cathode can therefore be a supported noble metal such as Pt, the support material being carbon or the like.

The fully assembled fuel cell can have stack designs to increase the electrical output. Any of the known stack configurations designed for compactness and efficient supply of fuels to the anode and oxidant gas to the cathode can be used. Any of the conventional means for providing a steady stream or flow of fuel to the anode or reducible gas (e.g., air or oxygen) to the cathode can be used. Electrode leads and external circuitry can also be conventional. Typically, an electric motor will be included in the external circuit.

EXAMPLES

Example 1

Current-potential curves were obtained using two electrocatalysts for ethanol oxidation in an electrochemical cell. An electrocatalyst of the invention, in this case $SnO_2$ and Rh clusters on the surface of Pt all on a carbon support (Pt/$SnO_2Rh$/C), and a commercially available electrocatalyst, here Pt—Ru (20%), were tested for performance in an anode of an ethanol fuel cell.

Measurements were performed using a solution of 0.1M $HClO_4$ and 0.23M ethanol at 60° C. in an all-glass electrochemical cell with a three electrode arrangement. An equal amount of Pt (150 µg/cm$^2$) was used for the preparation of all catalysts. The approximate surface area of the catalyst was 0.28 cm$^2$. All of the catalysts were in the form of a powder and were supported by 63% carbon (Vulcan™) and placed on a glassy carbon disk electrode and covered by a drop of dilute Nafion alcohol solution to leave a thin layer upon alcohol (ethanol) evaporation. The reference electrode was connected to the solution through a Luggin capillary.

The current-potential curves were obtained using a quasi-stationary potentiodynamic regime, with a sweep rate of 50 mV/s. A BAS 100 potentiostat was set to a current density of 100 mA. Reversible hydrogen electrodes served as a reference and 2 cm$^2$ Pt foil served as counter electrodes.

FIG. 1 is a graph demonstrating the relationship between current and applied potential for the two electrocatalyst materials. The onset of the reaction occurs at considerably less positive potentials (ca. 220 mV) on $Pt/SnO_2Rh/C$ than on PtRu/C. The reaction rates on $Pt/SnO_2Rh/C$ are higher in the whole potential region tested.

Figure 2:
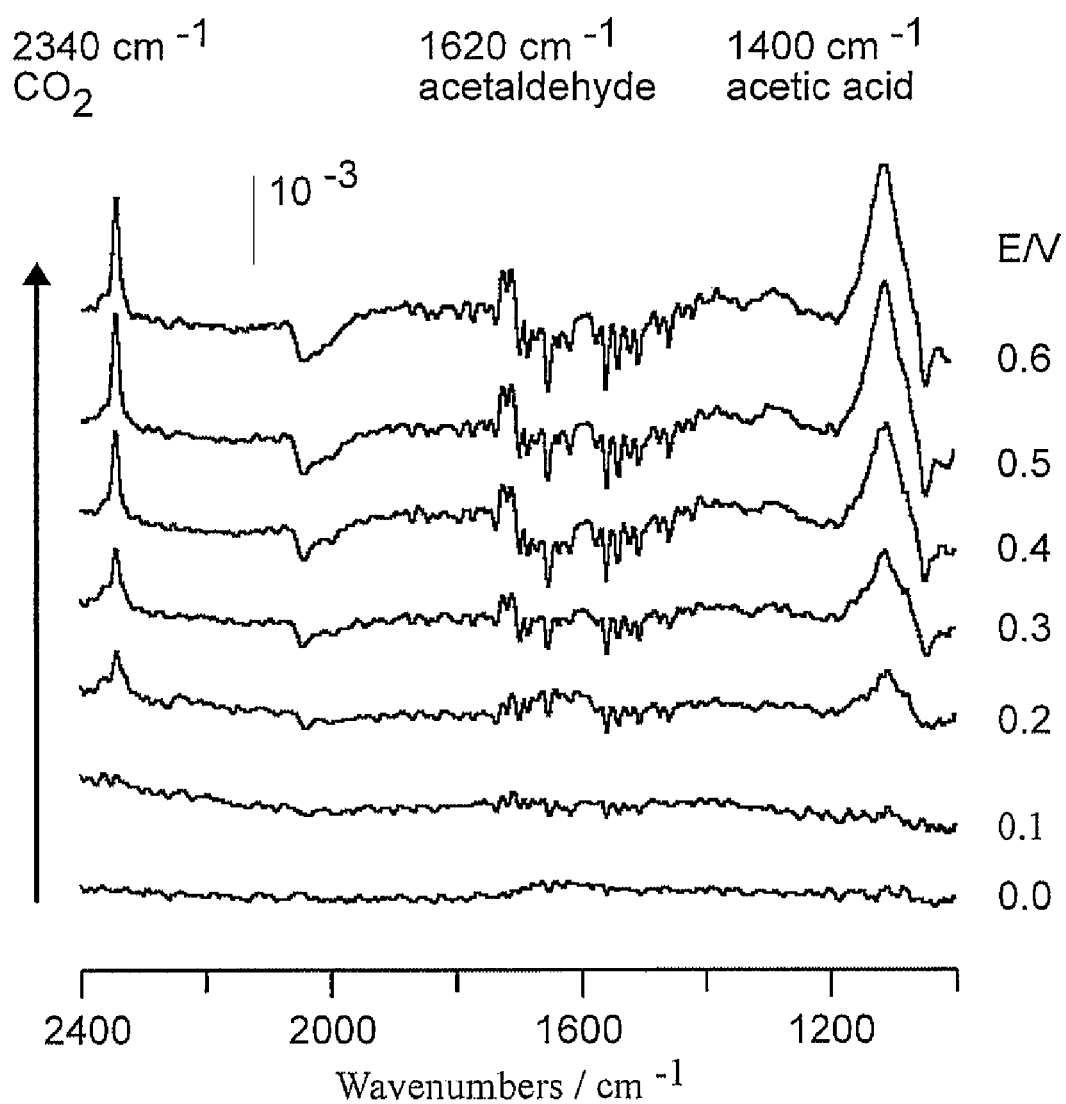
FIG. 2 is a series of IRRAS spectra for the ternary electrocatalyst referred to in FIG. 1.

FIG. 2 shows the corresponding infrared reflection absorption spectroscopy (IRRAS) spectra of the ternary electrocatalyst, $SnO_2$(2 ML)/Rh(0.5 ML)/Pt(111), in 0.1M $HClO_4$+ 0.1M ethanol, showing the $CO_2$ band at 2345 $cm^{-1}$. The data demonstrates that the ternary electrocatalyst breaks the C—C bond of ethanol and oxidizes CO to $CO_2$.

Example 2

Current-potential curves were obtained using two electrocatalysts to oxidize ethanol at an electrode surface. An electrocatalyst of the invention, here Rh and Pt clusters on the surface of $SnO_2$ all on a carbon support ($Rh/Pt/SnO_2/C$), and another electrocatalyst without Rh, $Pt/SnO_2/C$ in this example, were tested for performance in the anode of an ethanol fuel cell. The $Rh/Pt/SnO_2/C$ electrocatalyst contains approximately 40 mmol $SnO_2$, 12 mmol Pt and 8 nmol Rh.

Measurements were performed using a solution of 0.1M $HClO_4$ and 0.23M ethanol at 60° C. in an all-glass electrochemical cell with a three electrode arrangement. An equal amount of Pt (150 μg/cm$^2$) was used for the preparation of all catalysts. The approximate surface area of the catalyst was 0.28 cm$^2$. All of the catalysts were in the form of a powder and were supported by 63% carbon (Vulcan™) and placed on a glassy carbon disk electrode and covered by a drop of dilute Nafion alcohol solution to leave a thin layer upon alcohol (ethanol) evaporation. The reference electrode was connected to the solution through a Luggin capillary.

The current-potential curves were obtained using a quasi-stationary potentiodynamic regime, with a sweep rate of 50 mV/s. A BAS 100 potentiostat was set to a current density of 100 mA. Reversible hydrogen electrodes served as a reference and 2 cm$^2$ Pt foil served as counter electrodes.

Figure 3:
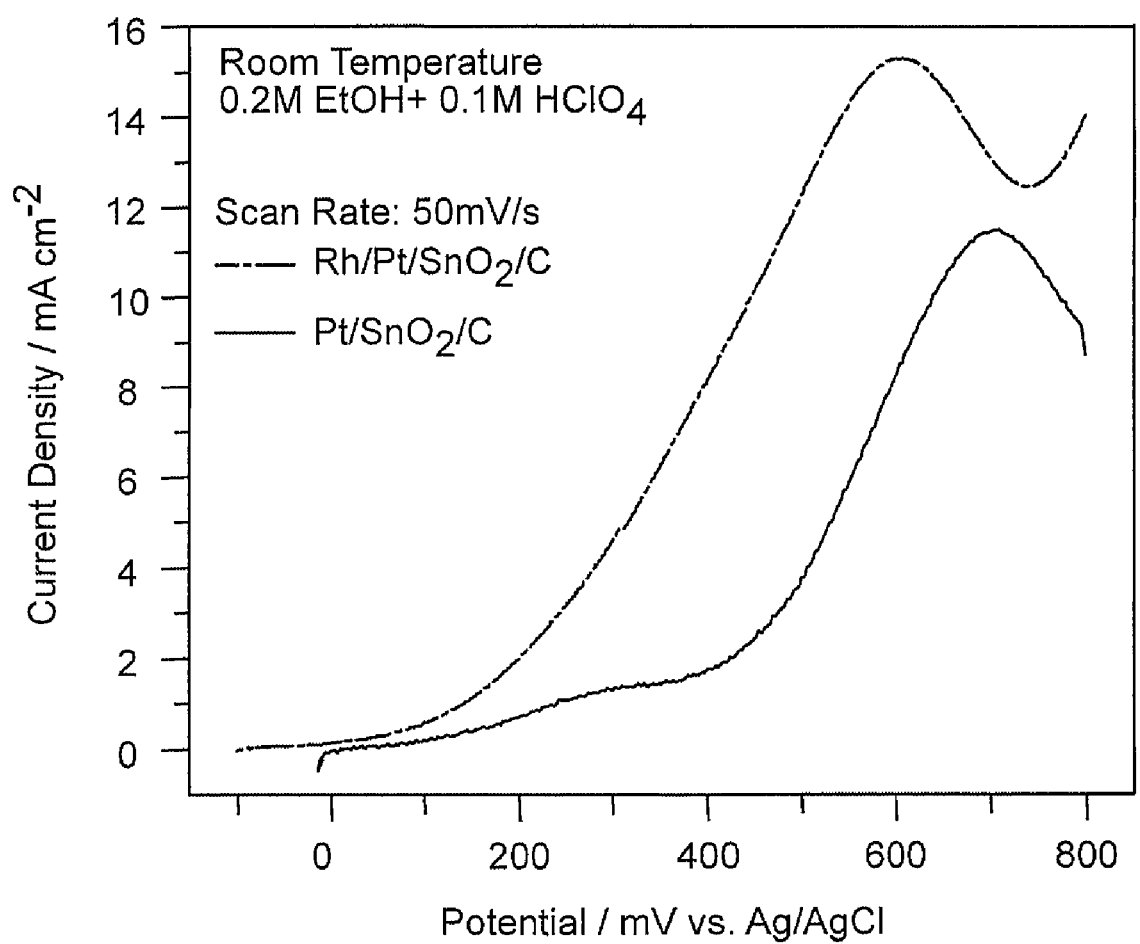
FIG. 3 demonstrates the relationship between current and applied potential obtained for two electrocatalyst materials.

FIG. 3 is a graph demonstrating the relationship between current and applied potential obtained from the two electrocatalyst materials. The onset of the reaction occurs at considerably less positive potentials (ca. 215 mV) on $Rh/Pt/SnO_2/C$ than on $Pt/SnO_2/C$. The reaction rates on $Rh/Pt/SnO_2/C$ are higher in the whole potential region tested.

As used herein, "clusters of A and B" or the like, refers to homogeneous clusters of A and homogeneous clusters of B, and/or heterogeneous clusters of A and B.

The foregoing examples have been described with reference to particular embodiments of the invention to provide clarity of exposition only, and are intended to be illustrative rather than limiting. For example, any C1 to C5 alcohol may be used in the place of ethanol, including methanol, butanol, and isomers of propanol. Furthermore, the support material need not be carbon, but any other convenient and useful material having sufficient conductivity and acid resistance. Similar substitutions and extensions may occur to one skilled in the art of electrochemistry following the teaching herein without departing from the scope of the invention.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A ternary electrocatalyst comprising: one or more particles, each particle having a core and a surface, and comprising tin dioxide ($SnO_2$), rhodium (Rh), and a second noble metal chosen from the group consisting of platinum (Pt), palladium (Pd), iridium (Ir) and gold (Au);
   wherein the core of the particles comprising $SnO_2$;
   and one or more clusters comprising about 2 to about 100 atoms of Rh and the second noble metal rests on the surface of the particles.

2. The electrocatalyst of claim 1, wherein:
   the $SnO_2$ particles are nanoparticles, each nanoparticle having at least one dimension from about 4 nm to about 100 nm.

3. A ternary electrocatalyst comprising: one or more particles each particle having a core and a surface, and comprising tin dioxide ($SnO_2$), rhodium (Rh), and a second noble metal chosen from the group consisting of platinum (Pt) and iridium (Ir); wherein the core of the particles comprises the second noble metal.

4. The electrocatalyst of claim 3, wherein:
   the second noble metal is Pt; and
   one or more clusters, each cluster comprising about 2 to about 100 atoms of Rh, about 2 to about 100 molecules of $SnO_2$, or a combination thereof, rest on the surface of the particles.

5. The electrocatalyst of claim 4, wherein:
   the Pt particles are nanoparticles, each nanoparticle having at least one dimension from about 0.1 nm to about 100 nm.

6. An anode employable in the oxidation of an alcohol in fuel cell, said anode comprising:
   one or more particles having a core and a surface, the particles having a ternary composition of $SnO_2$, Rh, and a second noble metal chosen from the group consisting of platinum (Pt) and iridium (Ir) and the particles supported by a support material.

7. The anode of claim 6, wherein:
   the support material comprise high surface area carbon.

8. The anode of claim 6, wherein the particles are nanoparticles having at least one dimension between about 0.5 nm and about 100 nm.

9. The anode of claim 8, wherein:
   the core of the nanoparticles comprises $SnO_2$
   the second noble metal is Pt; and
   the surface of the particles decorated with clusters of Pt and Rh, each cluster comprising from about 2 to about 100 atoms of Pt, Rh or combination thereof.

10. The anode of claim 9, wherein:
    the support material comprises high surface area carbon; and
    loading of the Pt is from about 1μg/cm$^2$ to about 200 μg/cm$^2$ and loading of the Rb is from about 1μg/cm$^2$ to about 200μg/cm$^2$.

11. The anode of claim 10, wherein:
    the nanopartices have at least one dimension from about 20 nm to about 80 nm.

12. The anode of claim 8, wherein:
    the core of the nanoparticles comprises the second noble metal; and
    the surface of the particles is decorated with clusters of $SnO_2$ and Rh, each cluster comprising from about 2 to about 100 molecules of $SnO_2$, from about 2 to about 100 atoms of Rh, or combination of thereof.

13. The anode of claim 12, wherein:
    the second noble metal is Pt;

loading of the Rh is from about 1μg/cm² to about 200 μcm²; and loading of the $SnO_2$ is from about 20μg/cm² to about 400 μg/cm².

14. The anode of claim 13, wherein:
the nanoparticles. have at least one dimension from about 1nm to about 5 nm; and
the Pt loading is about 5μg/cm² to about 50μg/cm².

15. The anode of claim 6, wherein:
the alcohol is ethanol.

16. The electrocatalyst of claim 1, wherein the second noble metal is chosen from the group consisting of platinum (Pt) and iridium (Ir).

17. The electrocatalyst of claim 16, wherein the second noble metal is Pt.

* * * * *